L. Miller.
Mower.
No 766
Reissued Jul. 19, 1859
Fig. 1.
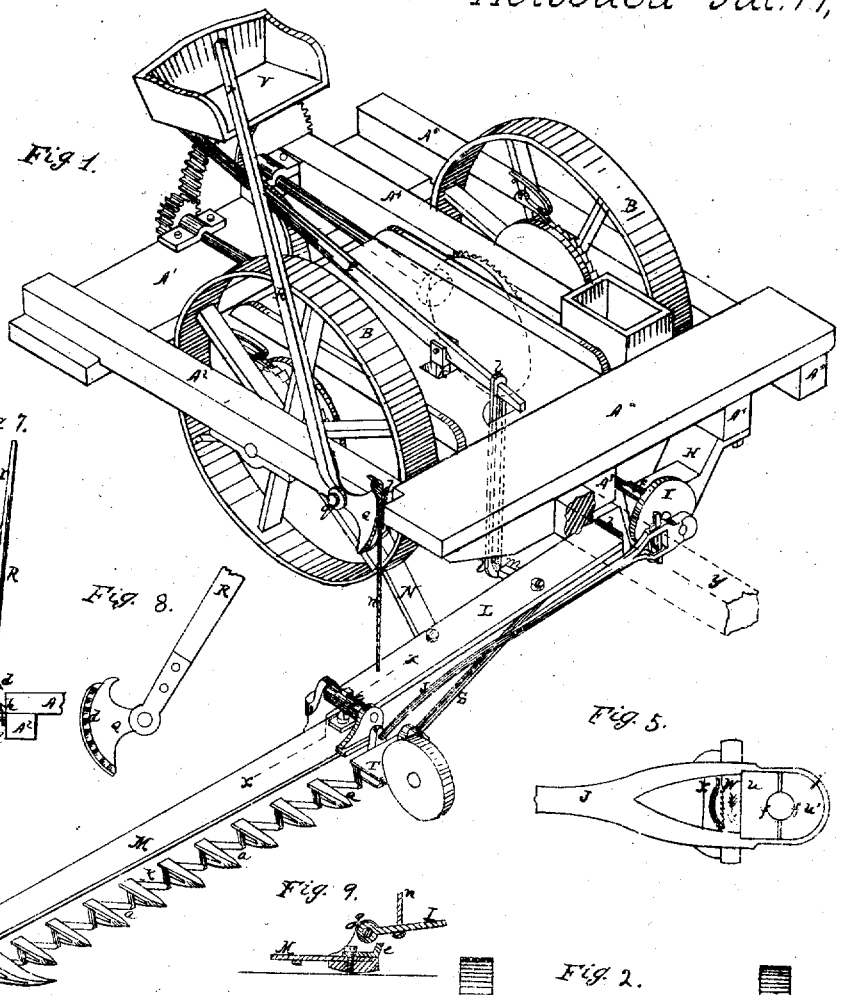
Fig. 6.
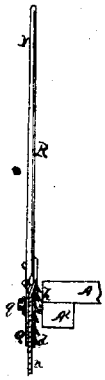
Fig. 7.
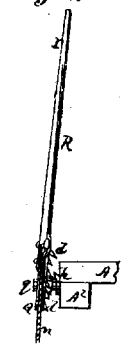
Fig. 8.
Fig. 5.
Fig. 9.
Fig. 2.
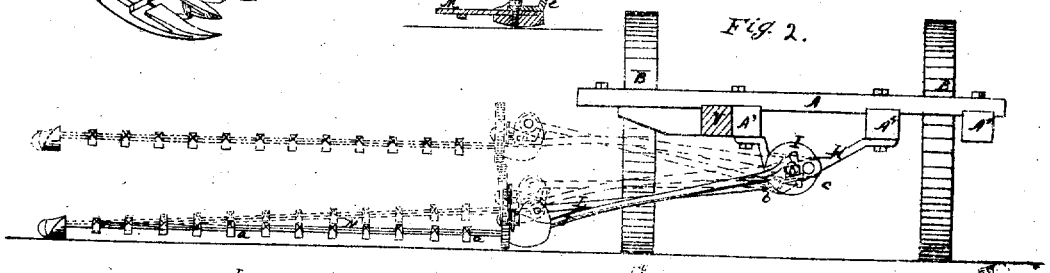
Fig. 4.
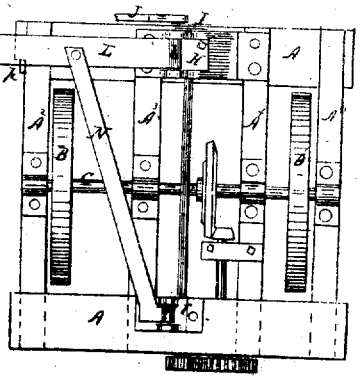
Fig. 3.
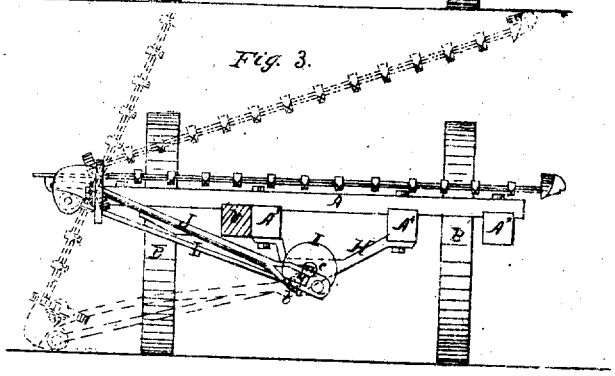

UNITED STATES PATENT OFFICE.

LEWIS MILLER, OF CANTON, OHIO, ASSIGNOR TO C. AULTMAN & CO.

IMPROVEMENT IN HARVESTERS.

Specification forming part of Letters Patent No. 20,180, dated May 4, 1858; Reissue No. 766, dated July 19, 1859.

DIVISION C.

*To all whom it may concern:*

Be it known that I, LEWIS MILLER, of Canton, in the county of Stark and State of Ohio, have invented certain new and useful Improvements in Machines for Harvesting Grain and Grass, of which the following is a full, clear, and exact description, reference being had to the accompanying drawings, which make part of this specification, in which—

Figure 1 represents a view in perspective of the machine as arranged for mowing. Fig. 2 represents a front elevation of the machine, the black lines showing the finger-beam resting upon the ground in the position it will occupy when the machine is mowing on a level surface, the red lines showing the position of the finger-beam when mowing on an uneven surface, with its left end raised to conform thereto, and the blue lines showing the finger-beam raised off and held parallel to the ground by means of a hand-lever to pass over an obstacle. Fig. 3 represents by the black lines a front elevation of the machine, with the finger-beam folded over upon the frame in a compact manner. The red lines show the finger-beam raised on end preparatory to being lifted by the hand-lever, and turned over upon the frame, and the blue lines show the finger-beam almost raised up and turned over upon the frame. Fig. 4 represents a view of the under side of the main frame and certain parts connected therewith, but showing more particularly the arrangement of the brace for supporting the coupling-arm. Fig. 5 represents on an enlarged scale a view of one side of a portion of the connecting-rod which transmits motion from the crank to the cutter. Fig. 6 represents a front view of the quadrant-lever for lifting and the ratchet-teeth and detent for holding up the finger-beam when raised; also, a fragment of the adjacent part of the frame detached from the machine. Fig. 7 represents a similar view of the same parts, the quadrant-lever and its ratchet-teeth being in the position they occupy when turned aside to disengage the teeth from the detent preparatory to raising or lowering the finger-beam. Fig. 8 represents a view of the side of the quadrant having the ratchet-teeth thereon; and Fig. 9 represents a vertical section at the line *x x* of Fig. 1, showing the knuckle of the joint connecting the finger-beam and coupling-arm.

That side of the machine on which the finger-beam projects when on the ground in the position shown in Fig. 1, I call the "right" side. The other I call the "left" side.

In operating mowing-machines it often happens that the cutter becomes bound more or less in the slots of the guard-fingers by reason of grass wedging in between the sides of the slots in the fingers and the sides of the cutter; and in working the cutter under such circumstances great force has to be exerted, which force, being sustained by the bearings of the crank, is apt to overstrain and work loose that part of the frame which sustains the bearing, and if the bearing of the crank be supported by a hanger or bracket projecting from the frame this liability to work loose is greatly increased. If the finger-beam be drawn by a coupling-arm hinged to a hanger or bracket on the frame, the force required to drive the cutter acts on the hanger or bracket which carries the hinge of the coupling-arm in one direction with the same force with which it acts in the opposite direction on the hanger or bracket which carries the bearing for the journal of the crank, and as the direction in which these forces act upon the hangers or brackets is reversed with every reversal of the motion of the cutter it is found to be difficult, if not impossible, especially in a wooden frame, to fasten these hangers so that they will not work loose. This working of the hangers impairs the durability of the machine, but is objectionable chiefly because it varies the stroke of the cutter, and thereby impairs its shearing action, and thus lessens the efficiency of the machine, and therefore it is of great importance to remedy this defect, and my contrivance for that purpose is the subject of this patent; and it consists in combining the bearing for the journal of the crank and the hinge of the coupling-arm with a hanger or bracket which is made common to both; and therefore any irregular or accidental yielding or vibration of the crank is imparted equally to the coupling-arm, finger-beam, and cutter, thus preventing any of the derangements of the stroke or action of the cutter, which are inevitable when the crank-bearing and the hinge of the coupling-arm are supported on separate brackets.

Besides, this arrangement lessens the cost of construction and the weight to be drawn by making one of the two hangers or brackets heretofore used perform the duty of both.

The accompanying drawings represent a mowing-machine having its main frame A A′ $A^2$ $A^3$ $A^4$ $A^5$ supported by an axle, C, and a pair of wheels, B and B′, and having a tongue, Y, for the horses to draw it by, projecting from the front of the main frame.

A finger-beam, M, projects from the right side of the frame, to which it is connected by an intermediate coupling-arm, L, hinged at its right end to the finger-beam, and at its left end to a hanger or bracket, H, projecting some distance downward from the under side of the main frame. This hanger, in addition to supporting the hinge *b* of the coupling-arm, also supports the bearing *c* for the journal of the crank, which imparts a vibratory motion to the cutter K through a connecting-rod, J. The hinge and bearing are placed as near as possible, in order that the raising and lowering of the coupling-arm may be on an axis of motion, as near as may be, coincident with the axis of motion of the crank, and thereby prevent any injurious interference with the stroke of the cutter from the movements of the coupling-arm.

The parts of the machine which have not been particularly described do not relate to the subject-matter of the claim under this patent, and need not therefore be further referred to here.

What I claim under this patent as my invention is—

The combination of the crank and the bearing for its journal, the cutter, the coupling-arm, and the hinge of its inner end, with a hanger which is made the common support for the hinge of the coupling-arm and the journal of the crank, arranged and operating substantially as herein set forth.

In testimony whereof I have hereunto subscribed my name.

LEWIS MILLER.

Witnesses:
S. HAWKES,
JAS. S. TONNER.